(12) United States Patent
Palombo et al.

(10) Patent No.: US 9,884,259 B2
(45) Date of Patent: Feb. 6, 2018

(54) ELECTRONIC MULTIUSER SCREEN PLATFORM, ESPECIALLY FOR GAMES, AND METHOD OF CHECKING AUTHORIZATION FOR THE EXECUTION OF PROGRAMS SUCH AS GAMES

(71) Applicant: SYLVIUS, Paris (FR)

(72) Inventors: Albert Palombo, Versailles (FR); Jean-Claude Woivre, Guyancourt (FR); Fabrice Madigou, Andresy (FR)

(73) Assignee: SYLVIUS, Paris (FR)

( * ) Notice: Subject to any disclaimer, the term of this patent is extended or adjusted under 35 U.S.C. 154(b) by 0 days.

(21) Appl. No.: 15/611,763

(22) Filed: Jun. 1, 2017

(65) Prior Publication Data

US 2017/0319971 A1   Nov. 9, 2017

Related U.S. Application Data

(63) Continuation of application No. 10/362,376, filed on Jun. 23, 2003, now abandoned.

(30) Foreign Application Priority Data

Sep. 8, 2000  (FR) ...................... 00 11462

(51) Int. Cl.
  *A63F 9/24*    (2006.01)
  *A63F 13/90*   (2014.01)
  *A63F 13/21*   (2014.01)
  *A63F 13/218*  (2014.01)
  (Continued)

(52) U.S. Cl.
  CPC .............. *A63F 13/90* (2014.09); *A63F 13/21* (2014.09); *A63F 13/218* (2014.09); *A63F 13/2145* (2014.09); *A63F 13/843* (2014.09); *A63F 2300/1075* (2013.01); *A63F 2300/201* (2013.01); *A63F 2300/206* (2013.01); *A63F 2300/407* (2013.01); *A63F 2300/552* (2013.01); *A63F 2300/8088* (2013.01)

(58) Field of Classification Search
  None
  See application file for complete search history.

(56) References Cited

U.S. PATENT DOCUMENTS

| | | |
|---|---|---|
| 3,940,136 A | 2/1976 | Runte |
| 4,521,014 A | 6/1985 | Sitrick |
| 4,570,158 A | 2/1986 | Bleich et al. |

(Continued)

FOREIGN PATENT DOCUMENTS

| | | |
|---|---|---|
| EP | 0556840 | 2/1993 |
| EP | 0965371 | 2/1999 |

(Continued)

*Primary Examiner* — Paul A D'Agostino
(74) *Attorney, Agent, or Firm* — Blakely Sokoloff Taylor & Zafman LLP

(57) ABSTRACT

The invention concerns an electronic platform-screen comprising (a) a globally flat case (200); electronic processing, storage and interface means housed in the case; (c) a flat screen display (110) arranged at an upper surface (202) of the case; and (d) a plurality of user-interface elements (300) for several users, distributed around the display screen and connected to the interface means housed in the case. The invention also concerns a method for controlling clearance for executing downloaded programmes such as games. The invention is applicable in particular to electronic games involving several players.

10 Claims, 7 Drawing Sheets

Figure 1:
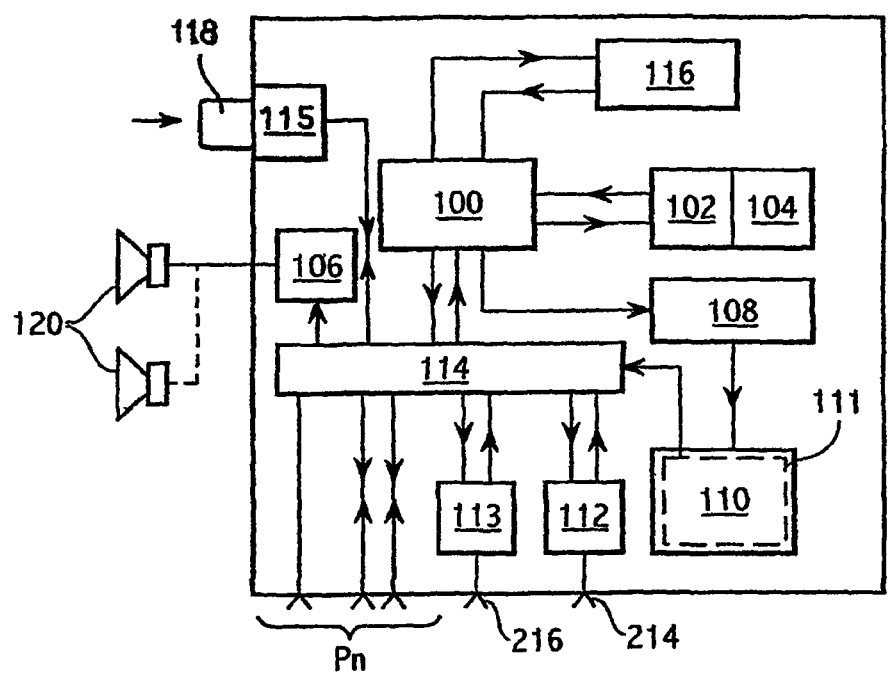

(51) Int. Cl.
 *A63F 13/2145* (2014.01)
 *A63F 13/843* (2014.01)

(56) References Cited

U.S. PATENT DOCUMENTS

| | | |
|---|---|---|
| 5,098,110 A | 3/1992 | Yang |
| 5,581,270 A | 12/1996 | Smith et al. |
| 5,668,591 A | 9/1997 | Shintani |
| 5,702,305 A | 12/1997 | Norman et al. |
| 5,938,528 A | 8/1999 | Glapion |
| 5,971,855 A | 10/1999 | Ng |
| 6,042,478 A | 3/2000 | Ng |
| 6,176,780 B1 | 1/2001 | Miyamoto et al. |
| 6,229,526 B1 | 5/2001 | Berstis |
| 6,478,679 B1 | 11/2002 | Himoto et al. |
| 6,509,896 B1 | 1/2003 | Saikawa et al. |
| 6,585,596 B1 | 7/2003 | Leifer et al. |

FOREIGN PATENT DOCUMENTS

| | | |
|---|---|---|
| JP | 10225572 | 8/1998 |
| WO | WO 99/34599 | 7/1999 |

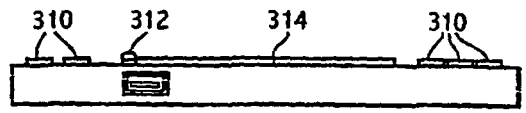
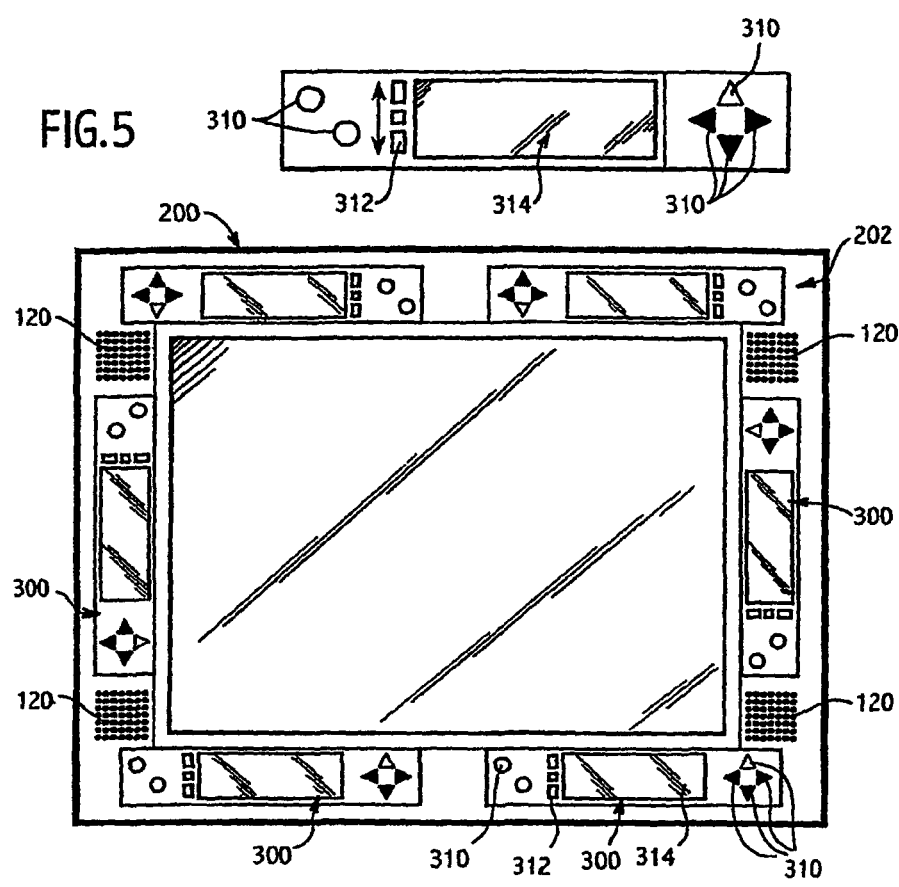
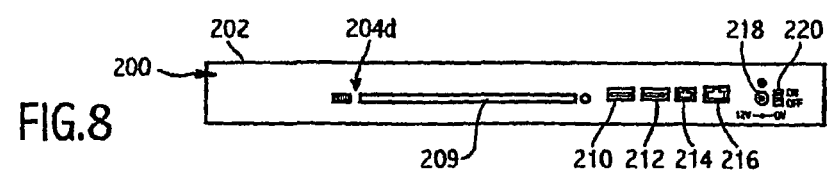

ELECTRONIC MULTIUSER SCREEN PLATFORM, ESPECIALLY FOR GAMES, AND METHOD OF CHECKING AUTHORIZATION FOR THE EXECUTION OF PROGRAMS SUCH AS GAMES

The present invention relates in general to electronic game apparatuses.

At present, two major categories of hardware for electronic games are known.

The first is formed by the dedicated "game consoles", comprising a central processing unit, to the input of which are connected one or more game "joysticks", and to the output of which is connected a cathode-ray tube television set.

The second comprises conventional computer systems, for example of the personal computer type, which execute specific game programs. In this case, the display is produced by the monitor belonging to the computer.

In both cases, one or more input interfaces, of the button joystick, mouse, joystick, etc. type, can be connected to the apparatus, depending on the game played.

However, these two major families of apparatuses have several drawbacks. Firstly, in order to play a game with several people, each person has to sit in front of the monitor, either with his own joystick, or sharing a single input interface such as a mouse, all the players facing the screen at some distance therefrom in order to enjoy appropriate visual comfort. It will be understood that this is not user-friendly.

Furthermore, the existing apparatuses require a display screen of large height and weight and a suitable support (table, desk, etc.) therefor, and it is not always easy to bring several players together in front of the same screen.

Consequently, it is observed that board games, especially because of the presence of a game board on which several players can carry out various types of action, have not yet been able to benefit from the new technologies, and at present still remain completely "physical", as opposed to "electronic". A consequence of this is that the users have to acquire and deploy a new physical game environment each time they desire to play a new game.

The present invention aims to mitigate these limitations in the prior art and to propose a novel electronic screen platform, especially for collective games such as board games or others, the input and output interfaces of which can be clearly allocated to the various players, and which has a user-friendliness which is far better than that of existing electronic game apparatuses.

More generally, an object of the present invention is therefore to offer a novel way of developing board games by enabling them to benefit from the new technologies.

Thus the present invention proposes an electronic multiuser screen platform, especially for electronic games, characterized in that it comprises:
- a generally flat casing,
- electronic processing, storage and interface means housed in the casing,
- a flat display screen provided on an upper surface of the casing, and
- a plurality of user interface elements for several users, distributed around the display screen and connected to the electronic interface means housed in the casing.

Some preferred, but nonlimiting aspects of the screen platform according to the invention are as follows:
The casing has a generally rectangular shape, with user interface elements on its four sides.
One or two sets of user interface elements for one or two users, respectively, are provided on each side.
The sets of user interface elements comprise joysticks which are separate from the casing.
The joysticks are connected to the electronic interface means via cables and separable connectors on each side of the casing.
The joysticks are connected to the electronic interface means via a wireless link such as an infrared link.
A plurality of housings for the joysticks are provided at the periphery of the casing.
Each joystick can be used just as well in its housing as outside thereof.
The sets of user interface elements are integrated into the casing, in a peripheral region thereof.
Each set of user interface elements comprises a miniature display screen and a set of control buttons.
Each set of user interface elements further comprises a member for moving a cursor on the miniature display screen.
The screen platform further comprises at least one loudspeaker for sound reproduction.
Each set of user interface elements comprises movement means acting on at least one display element displayed by the display screen, while the way in which said movement means act depends on the side of the casing from which the set of user interface elements can be used.
A code is provided for each joystick according to which side of the casing said joystick can be used and/or the position of said joystick.
The screen platform has a connector for downloading games programs.
The casing has layouts for maintaining a vertical position.
The screen platform further comprises a touch-sensitive detection device superimposed on the screen.
The screen platform further comprises a rechargeable battery as its electrical power supply.
The screen platform comprises display control means capable of altering the orientation of the display on the flat screen, especially so as to adapt said orientation to a particular player.

According to another aspect, the present invention proposes a method of checking the authorization of a user to execute a program on a computer system, and especially a game on a computer game platform comprising a device for reading portable storage objects, characterized in that it comprises the following steps:
providing the user with a portable object capable of containing an unmodifiable program identifier in a first memory zone,
establishing a connection with a server via a computer network,
verifying the presence of a program identifier in the memory of the portable object using the read device,
transmitting the identifier to the server, and
downloading the program corresponding to said identifier from the server to the computer system.

Preferred, but nonlimiting aspects of this method are as follows:
the computer system comprises an unmodifiable memory zone containing a unique identifier for said system, and in that the portable object also comprises a second unmodifiable memory zone capable of containing a computer system identifier.
The method also comprises the steps consisting in:

comparing the system identifier stored in the system with the system identifier stored in the portable object, and when these correspond, authorizing the execution of the program.

The method also comprises the following steps:
  on each interaction between a portable object and the read device, determining whether the second memory zone of said portable object contains a system identifier, and
  when this is not the case, writing into said second memory region the identifier of the system to which the read device belongs.

The method further comprises the step consisting, at server level, in recording said system identifier in a database.

The method also comprises the following steps:
  during each transaction between the computer system and the server, determining whether the second memory zone of a portable object interacting with the read device of said system contains a system identifier corresponding to an identifier recorded in the database of the server, and
  when this is not the case, abandoning the transaction.

The method further comprises the following steps:
  attaching a number combining a system identifier and a program identifier to a program to be downloaded,
  in the system receiving the program, calculating a number combining, in the same way, the identifier of the system in question and the program identifier stored in the portable object, and
  comparing the number attached to the downloaded program with the number calculated in the system.

Figure 2:
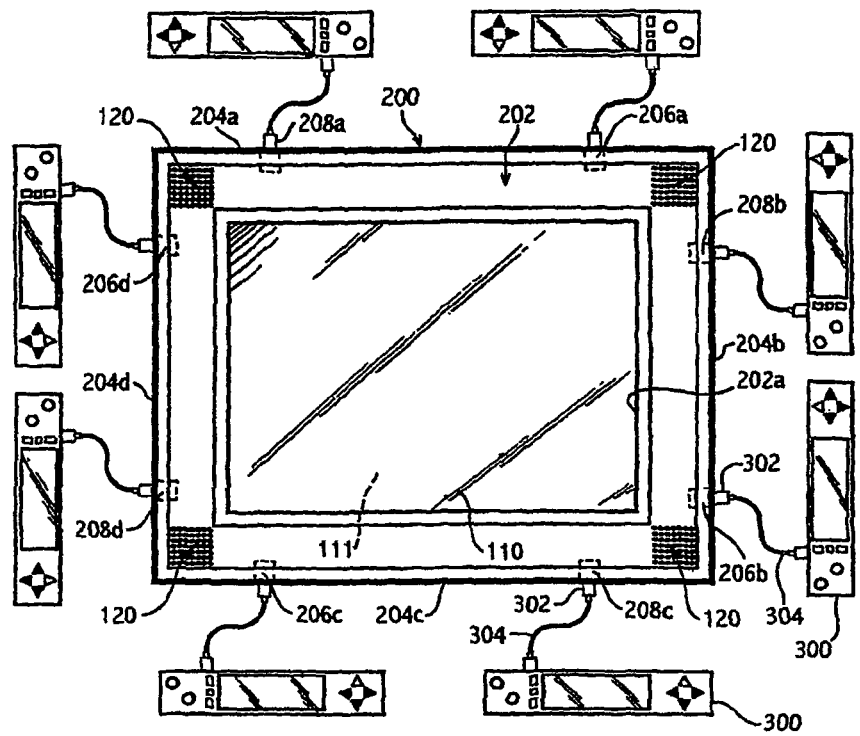
Figure 3:
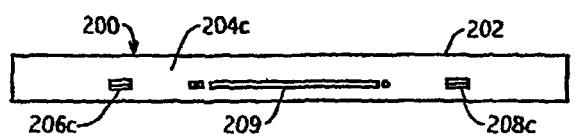
Figure 4:
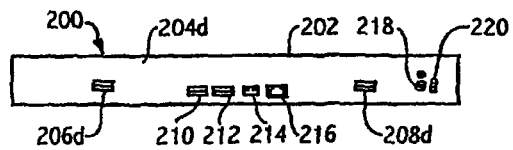
Figure 9:
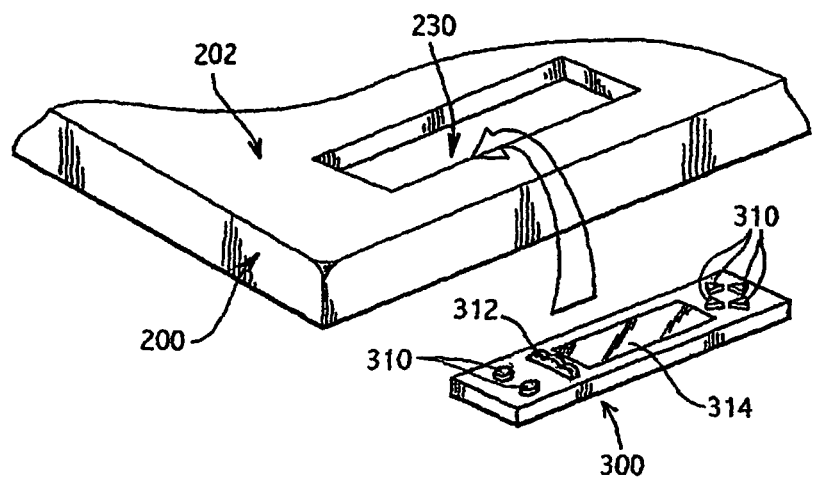

Other aspects aims and advantages of the present invention will become more clearly apparent on reading the following detailed description of preferred embodiments thereof, given by way of nonlimiting example and made with reference to the appended drawings, in which:

FIG. 1 illustrates schematically the electronic architecture of a screen platform according to the invention, FIG. 2 illustrates, in top view, the casing of the screen platform and its various user interfaces (input and output), FIGS. 3 and 4 are two side views of the casing of FIG. 2, FIGS. 5 and 6 are detailed top and side views, respectively, of a user interface, FIG. 7 is a top view of the casing of another embodiment of a screen platform according to the invention, FIG. 8 is a side view of the casing of FIG. 7, and FIG. 9 is a partial perspective view of a particular layout of the casing of a screen platform according to the invention.

Figure 10:
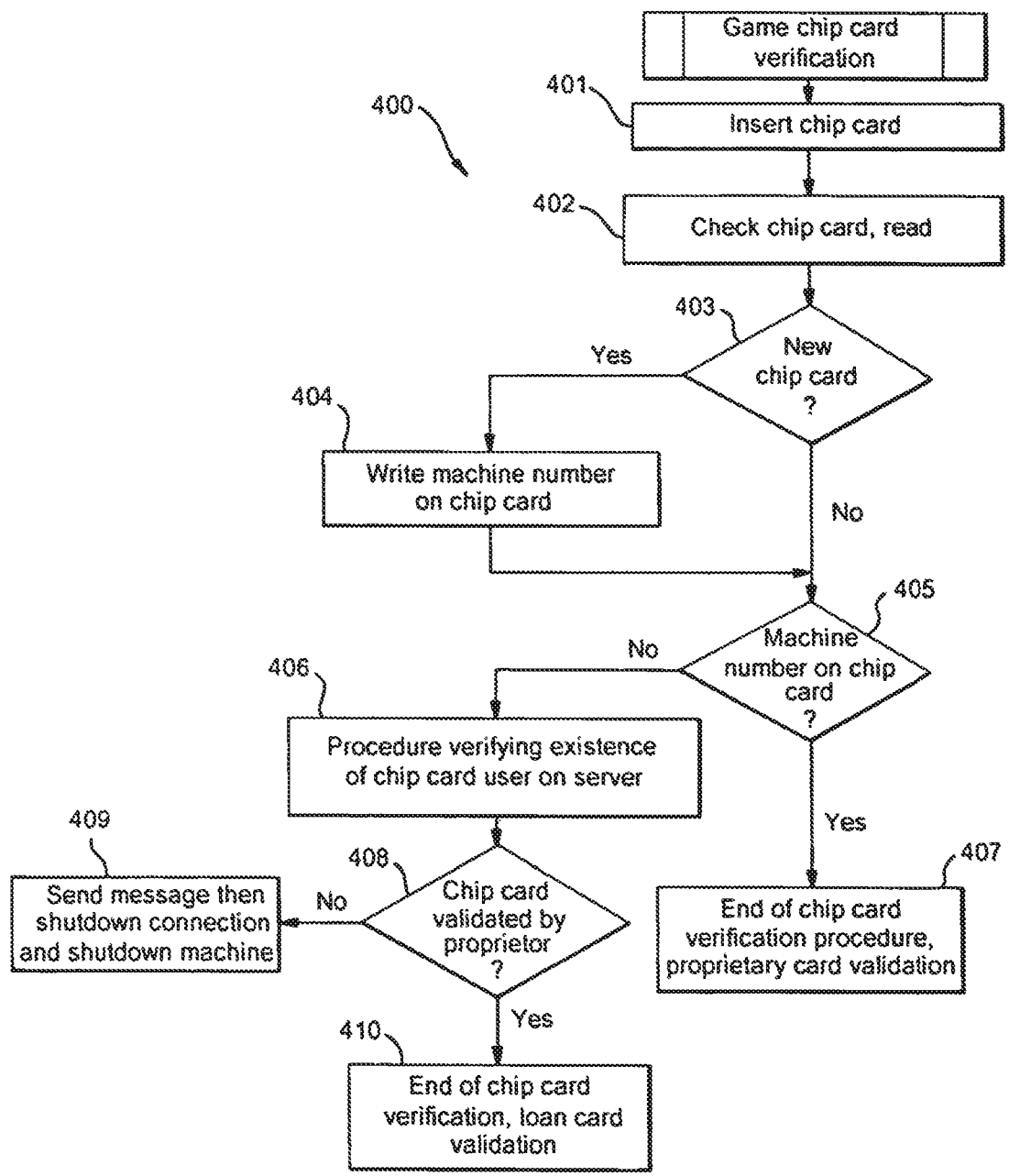
Figure 11:
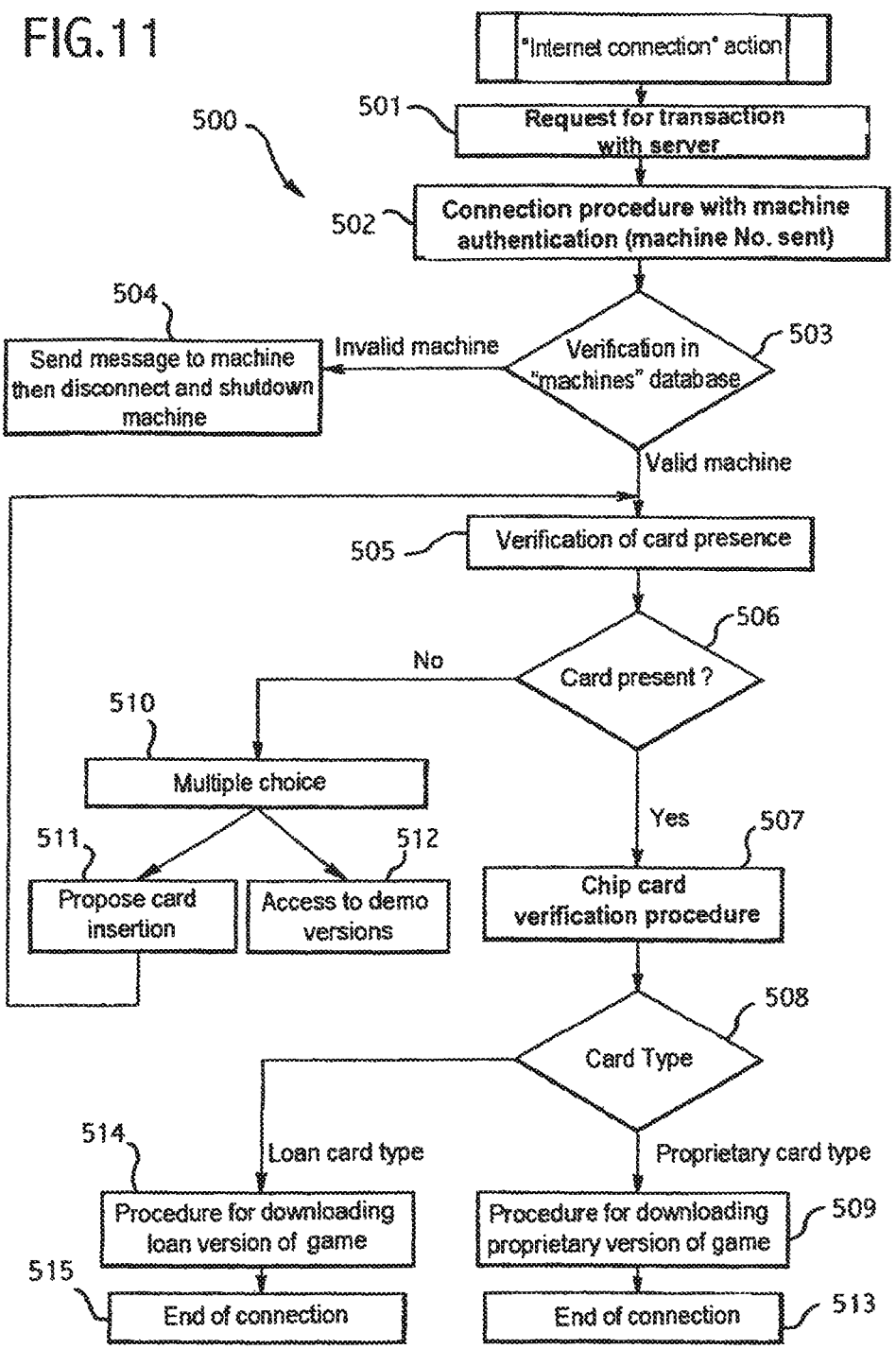
Figure 12:
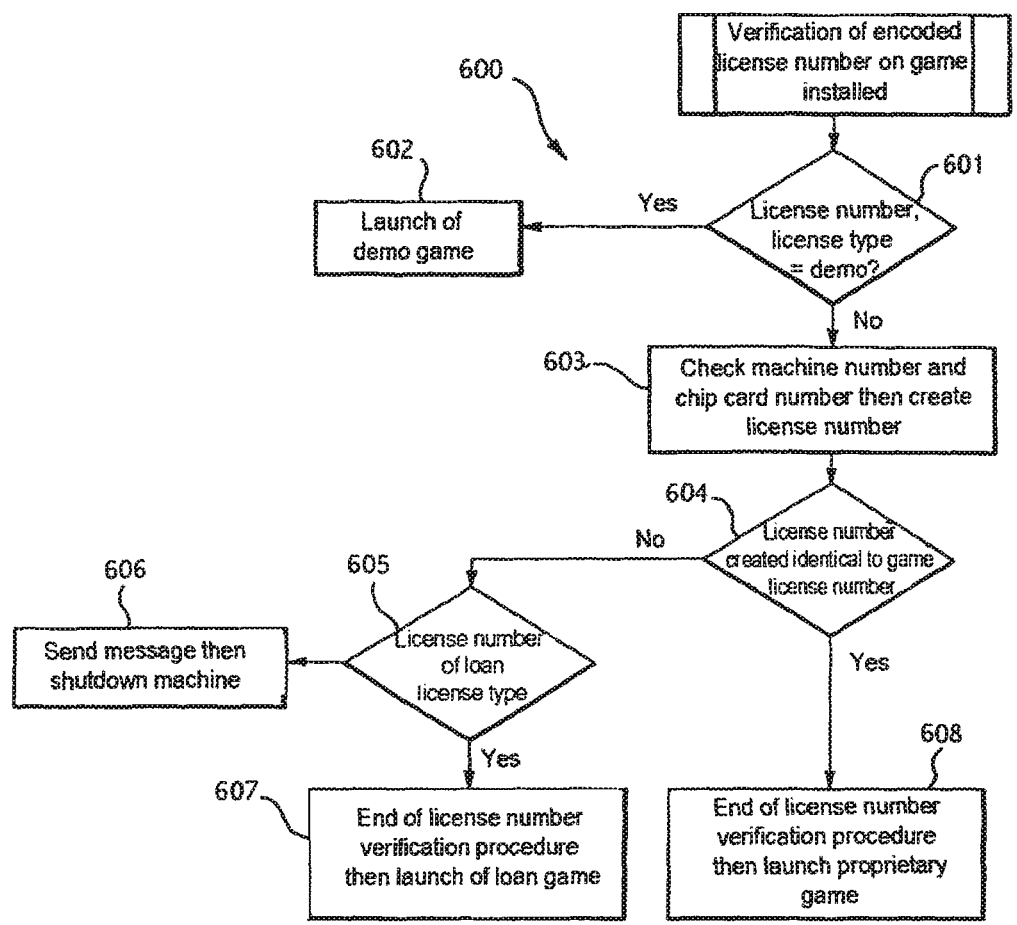

FIG. 10 is a logic diagram of an authentication procedure which can be used in the screen platform of the preceding figures, FIG. 11 is a logic diagram of a procedure for connecting to a server from which games which can be executed on the screen platform of the preceding figures can be downloaded, FIG. 12 is a logic diagram of a procedure for launching a game downloaded using the preceding procedure.

With reference first of all to FIG. 1, an electronic screen platform according to the invention preferably comprises a standard electronic card 10 housing a microprocessor 100, random access and read-only memories 102 and 104, sound processing circuits 106 (specialized chip) reproducing sounds over loudspeakers 120 or other transducers described further on, a video circuit 108 for driving a flat display screen 110, and a modem 112 and a network interface (Ethernet or another) 113 connected via input/output circuits 114.

The flat screen 110 can be made using the conventional technologies (active-matrix liquid crystals, luminescent polymers or organic materials, etc.). Advantageously, the read-only memory 104 is in the form of one or more interchangeable casings, so as to allow certain software components (BIOS, etc.) resident in the screen platform to be updated.

Furthermore, a mass storage unit 116, such as a hard disk, a flash memory, etc. is provided for storing applications and associated files (especially saved files for parameters, etc. in the case of games).

The input/output circuits 114 comprise a set of input/output controllers defining a number of preferably standardized connection ports Pn, (universal serial bus USB ports, infrared ports, etc.).

Joysticks are intended to be connected to these ports as will be described in detail below.

Other peripheral equipment, such as a CD-ROM or digital versatile disk (DVD) reader, a chip card reader (memory, microprocessor, etc.) denoted by the reference 115 (the chip card itself being denoted by the reference 118), microphone socket, headphones socket, etc may also be associated with, or if necessary integrated in, this central processing unit in a manner known per se.

A number of functionalities which can be implemented when the platform comprises a chip card reader will be detailed below.

Furthermore, it is advantageous for the flat screen to integrate a touch-sensitive detection system 111 superimposed onto the screen 110, using a suitable interface (not shown), for entering commands by hand, in a manner known per se.

The electrical power supply for the assembly is provided either by an integrated supply unit, or by an external supply unit, in which case the screen platform may have a rechargeable battery enabling it to be used without connecting it to the mains.

Thus, unlike the conventional game systems (desk computer or dedicated console), an independent multiuser game screen platform is obtained, which makes it possible to play in the train, in the car, outdoors, etc.

With reference now to FIGS. 2 to 4, the screen platform comprises a generally rectangular flat casing 200, with a thickness typically of a few centimeters and a length and a width of a few tens of centimeters.

The majority of the upper surface of the casing 202 is occupied by an opening 202a receiving the display screen 110, covered as necessary with its touch-sensitive panel 110 using technologies known per se.

Four miniature loudspeakers 120 are provided at the four corners of the upper surface 202, on the periphery of the screen 110.

The four sides 204a, 204d of the casing 200 each have two connectors, respectively 206a-208a to 206d-208d connected to the aforementioned input/output controllers 114 and intended to receive complementary connectors 302 provided on leads 304 each belonging to a joystick 300.

With reference most particularly to FIGS. 5 and 6, each joystick comprises an assembly of thumbwheel buttons and/or control levers (in this case six control buttons 310 and one control thumbwheel 312), a liquid-crystal display screen 314 (of alphanumeric type with, for example, 2 to 4 lines of 80 to 120 characters or graphical), the assembly being connected to an internal integral electronic card (not shown), for example in the form of a suitably programmed standard microcontroller, the input/output encoding/decoding circuits and the circuits communicating with the central processing unit 100, 200 via the connection 302, 304.

The six buttons comprise, for example, a validation button and a cancel button to the left, and four movement buttons (up, down, left, right) to the right. Furthermore, the thumbwheel 312 is advantageously used to move a text cursor over the display 314 so as, for example, to carry out selections which will be validated for example using the validation button.

Advantageously, the connection between the joysticks and the central processing unit is made according to the USB (Universal Serial Bus) standard, so as to allow both the "hot plug" connection of any joystick, and the self-configuration of the assembly on each connection and disconnection of a joystick.

As a variant, it is possible to provide a wireless link, preferably by means of infrared, between each joystick 300 and the central processing unit 100, 200.

Returning to FIGS. 3 and 4, the side 204c of the casing 200 has, apart from the connectors 206c, 208c for joysticks, an orifice 209 for inserting a CD-ROM or DVD or other information medium (memory card, etc.) into the corresponding reader.

As for the side 204d of the casing, apart from the connectors 206d, 208d, it has:
- two USB connectors 210, 212 for other peripherals (printer, mass storage, keyboard, mouse, etc.);
- a telephone line connector 214;
- a network connector 216;
- a connector 218 for an external power supply; and
- a start/stop button 220.

According to one advantageous feature, the four keys for moving the joysticks may involve movements which depend on the side of the screen platform to which the joystick is connected. Thus, for example, the "up" key (triangle whose apex points upward in FIG. 5) will still enable the user to obtain movement on the screen 110 in the direction away from the user.

From the technical standpoint, this can easily be produced by suitable coding of the joystick sockets depending on which side they are located.

FIGS. 7 and 8 illustrate a first embodiment of the invention, according to which the joysticks 300 are integrated with the central block 200. In this case, the external technology for connecting the joysticks is completely removed, and the screen platform can be transported more easily.

In the configuration illustrated in FIG. 7, only six joysticks are provided, that is two on each of the long sides and one on each of the two small sides, the four loudspeakers 120 being positioned slightly offset with respect to the corners of the casing 200.

Furthermore, in this same embodiment, a single side 204d of the casing brings together the additional connection technology described above, denoted by the same reference numbers.

According to another variant, illustrated schematically in FIG. 9, the periphery of the casing 200 incorporates, on the periphery of its upper surface, a plurality of housings 230 intended to removably accommodate the joysticks, using a suitable snap-fasten mechanism. In the case of joysticks connected by a cable, a placement for the cable is provided at the bottom of the housings or, as a variant, a winding mechanism.

In the case of a wireless link, such arrangements are unnecessary.

Thus the variant of FIG. 9 enables the screen platform to be used equally in the mode of FIG. 2 or in the mode of FIG. 7, depending on the tastes of the users and/or the type of game.

According to another aspect, the platform is preferably designed to execute games (or any other applications) which are not loaded from a physical medium (especially a CD-ROM or cartridge containing a ROM memory, or else a hard disk), but loaded via a network such as the Internet, with management of access rights determined by a portable object, in this instant, a chip card 118 or equivalent. Thus in this case, the platform is marketed with one or more chip cards determining as many access rights to execute games.

In brief, a chip card of the game type supplied with the platform or purchased separately enables the platform to establish a connection with a server for the purpose of downloading the corresponding game to the platform according to a given procedure.

Still in brief, each platform has an identifier which is specific to it, for example frozen in a ROM memory during the fabrication thereof. Similarly, each chip card has its own identifier, and the server, before downloading a game to the platform, verifies the platform identifier and the chip card identifier, the downloading only being possible if, in the memory for managing the server, there is a match between the two.

This functionality makes it possible to download a game as many times as desired, but only onto the same platform, so that copying the game in question to other unauthorized platforms is made impossible.

Furthermore, it is preferable that execution of a game can only be launched by the platform if the chip card for the game in question is actually present in the chip card reader 115 of the platform.

It is also possible to make a provision for the platform and the server to allow a game purchase transaction to be carried out, in this case, a bank card being inserted into the chip card reader of the platform and a secure payment transaction being carried out before the game can be downloaded.

Furthermore, the platform is advantageously marketed with a chip card having a configuration containing or able to contain a number of parameters relating especially to the type of connection (switched telephone network, cable, "ADSL" connection, etc.) with the network and the addresses (RCT, URL or equivalent call numbers) enabling access to the servers from which the games can be downloaded, or else to a central server containing a database of games which can be downloaded.

The configuration cards will typically be different depending on the countries in which the platforms are marketed.

During the first installation of the platform, the configuration card is inserted into the chip card reader, a first connection is made with a central games server, and the platform in question is registered in a "platforms" database of the server, for reasons explained below.

Next, the procedure 400 for verifying the chip card determining access rights for a given game will be described in more detail and with reference to FIG. 10, a procedure carried out jointly at platform level and at server level.

In the present example, the game chip card is of the write-once-read-only (ROM) type, which cannot be altered or rewritten.

A game chip card, whether it is delivered with the platform or else purchased from a distributor, determines the access rights for a given game and contains an identifier for the game in question, and a memory zone which is initially empty intended to receive the identifier of the platform on which the game will be executed for the first time.

For this purpose, in step 401, the card in question is inserted into the reader 115 of the platform. In step 402, the content of the chip card is read and step 403 determines whether or not a memory zone thereof, intended to contain the platform identifier, is empty.

When this is the case, the process goes to step 404 where the identifier of the platform in communication with the server is read into the memory of said platform, and this identifier is written in the memory zone in question, then it goes to a verification step 405.

Where this is not the case, the program goes directly to this verification step 405 where the content of the memory zone of the chip card intended to contain the platform identifier is read and compared to the identifier of the platform in which the card has been inserted. Where this does not correspond (which will not be the case if the process has gone via step 404—the case of a new chip card), the platform then engages a procedure with a server in step 406 for the purpose of determining (step 408) whether the platform identifier read from the chip card corresponds properly, in the "platforms" database of the server, to a duly recorded platform. Where this is not the case, the process finishes at step 409 by displaying an error message on the platform and by shutting down the connection. On the other hand, if the platform identifier is correctly written, the verification procedure finishes at step 410, which indicates that the chip card is on loan, and that the corresponding game can be downloaded and executed, but erased from the memory after the end of execution, as will be seen in detail below. Now if step 405 reveals that the identifier of the platform receiving the card is identical to the platform identifier stored in the card, the process then finishes at step 407, which indicates that the chip card has been loaded on the platform of its owner.

FIG. 11 shows the process for connecting to the server via the Internet, denoted overall by 500. In step 501, a request for a transaction with the server is triggered via the user (via a suitable menu, as will be seen below).

The connection is established in step 502, during which the platform identifier is transmitted to the server. In step 503, the server verifies whether the identifier in question corresponds to a platform which is referenced in the "platforms" database of the server. Where this is not the case, the platform is considered as invalid, and a corresponding message is displayed by the platform and the connection is shut down, in step 504.

If the platform is recognized, the following step 505 consists in interrogating the chip card reader 115 in order to obtain a signal showing the presence (or absence) of the card. This signal is tested in step 506. If a card is present, the card verification procedure 400, as described with reference to FIG. 10, is executed in step 507. In the case where this verification is successful, that is to say leads to one of steps 407 and 410 of FIG. 10, the process tests the type of situation (card on loan or card on a platform of the owner) in step 508. In the first case, the procedure for downloading the game in the "loan" version or mode is executed in step 514 (which will involve erasing the game after use), the game being determined by the game identifier stored in the chip card, then the connection is shut down in step 515. In the second case, a procedure for downloading the game in the "owner" version or mode is launched in step 509, then the connection is shut down in step 513.

Returning to step 506, if there is no chip card present in the reader 115, then in step 510, the server offers choices to the user via the platform, in particular the choice of inserting a chip card into the reader 115 (step 511), or of accessing demonstration versions (generally free) of games without a chip card (step 512).

The downloading procedure itself (not illustrated) consists in transferring an executable version of the game, compressed as was seen above, to the platform.

Advantageously, in order to prevent the fraudulent transfer of the game to another platform, the computer code of the game sent contains information representative of the platform identifier (and if necessary a client number), this information being verified at each launch of the game, and preventing the launch if the platform number contained in the code and the identifier of the platform on which it is desired to execute it do not correspond. The computer code also contains an encoded license number, for reasons explained below.

The launch procedure (execution) of a game stored in the platform after downloading is illustrated in FIG. 12 and is denoted overall by the reference 600. It will be stated beforehand that a game downloaded from an authorized server comprises, within its code, a license number of which there are, in the present example, three types:

"demo" license, corresponding to a demonstration version (generally free) of the game, which can be executed on any platform;

"proprietary" license, corresponding to a game downloaded onto a platform where the identifier is the same as the platform identifier contained in the game chip card (see above);

"loan" license, corresponding to a game downloaded to a third platform (see above and below).

This license number is preferably determined by an encoding algorithm involving the platform identifier and the game identifier, it being possible for this algorithm to be reversible or not (in this case, not reversible).

In step 601, the encoded license number of the game is read, and if it involves a "demo" license, execution of the game in the demonstration version is launched in step 602.

Where this is not the case, the platform is aware that is involved a "proprietary" license or a "loan" license. In this case, the central processing unit of the platform reads the platform identifier in the memory of the platform, and reads the game identifier in the game chip card inserted in the platform reader, and recalculates, using the aforementioned encoding algorithm, a license number (all in step 603). In step 604, the license number contained in the downloaded game and the license number reconstructed in the platform are compared, and where they are the same, the verification procedure finishes at 608 and the "proprietary" game can be executed.

If the result of step 604 is that the license numbers do not correspond, the process goes to step 605 where the platform verifies whether the license number denotes a license of the "loan" type. Where this is the case, the verification procedure finishes at step 607, and the game of the loan type can be executed (while being erased from the platform memory at the end of the game, as already indicated).

If the response to step 605 is negative, then this is because it has not been possible to identify any valid license number, and an error message is displayed on the screen 110, and if necessary, the platform is shut down (step 606).

As already indicated above, according to another option intended to provide better flexibility of use, it is possible to make provision for using a game chip card, in which the number of a given platform has been written, on a different platform. In this case, by introducing the game chip card into said different platform, it is possible to download a normal version, or else a limited version, of the game in question. However, when the player or players decide to stop using this game on said different platform, it is then automatically erased from the memory of the platform, so that no new execution is possible (except in the presence of the game chip card as described above).

An example of a user interface which can be used with the platform of the invention will now be described briefly.

When switching on the platform, a single "Menu" button appears on the display screen 110, from which it is possible to access submenus such as: "Configuration", "Internet connection", "Choose" and "Archive", which in turn enable submenus at even lower levels to be accessed.

The "Configuration" submenu enables the platform to be configured, such a configuration only being possible if the configuration chip card has already been inserted into the chip card reader. This configuration in particular includes the configuration of the type Internet access (by modem, network card, etc.), server addresses, network parameters, etc.

The "Internet connection" submenu enables communication to be established with a given server, for the purpose of downloading a game from said server. As has been seen, this involves having and inserting the chip card determining the access rights for the game in question into the chip card reader. Advantageously, compression/decompression techniques are implemented at server and at platform level in order to accelerate the transfers, the decompression preferably being carried out automatically during the first launch of the game.

The "Choose" submenu makes it possible to choose a game to be executed from all the games already loaded in the memory of the platform.

Finally, the "Archive" submenu enables the games currently stored in the platform to be compressed, in order to release space in the memory.

Of course, a person skilled in the art may provide numerous variants and additions to the invention.

First of all, as for the general shape of the central processing unit 200, it is possible to give it any shape other than square or rectangular, depending in particular on esthetic or ergonomic considerations.

Moreover, the screen platform according to the invention may be equipped, internally and or externally, with connectors and associated placements for extension modules such as:
  interface for a video monitor or television set;
  memory extensions;
  all interfaces with other items of equipment.

In particular, the casing 200 may comprise, especially in its back (away from the screen 110), layouts for positioning it in the vertical orientation (frame, etc.) and/or for anchoring it to the wall.

Furthermore, although the display screen has been described as being flat, the latter may adopt a curved shape, for example rounded, especially given the new technologies using organic phosphors.

It will also be noted that provision can advantageously be made to connect two screen platforms to each other, for example using their respective network interface, their USB connectors, etc., or else a wireless link, in particular to increase the possible number of players or else to play games (of the battleships type) where each player has his own screen which the other player must not be able to observe. In the latter case, provision can also be advantageously made for means to temporarily assemble two screen platforms, back to back, in the vertical position (or in any other mutually desired position).

According to another variant, provision may be made for the display on the screen 110 to have an orientation which could be altered, so that a user could observe the game situation naturally, that is to say with up being upward (relative to the user), down being downward, etc., in the same way as if, during the actual game, the game board was turned by 90° each time a player took a turn.

For example, in the case of an electronic game of the "Scrabble" (registered trademark) type, the display on the screen 110 is controlled so that the player whose turn it is sees the virtual game board restored on the screen 110 "in his direction", that is to say in the way which is most visible to him.

This control of the display is easily carried out with conventional techniques for modifying the reading of the video memory. It could be manual, under the control of a button provided either on the game board (physical button or virtual button on the screen, in cooperation with the touch-sensitive panel function), or on the joystick of the user. It may also be automatic, on the assumption that the logic of a given electronic game is capable of identifying the player whose turn it is.

According to yet another variant, the same chip card may contain several game identifiers, so as to authorize the downloading of several games (for example of the same series or with the same theme).

The invention claimed is:
1. An electronic multiuser screen platform, especially for electronic games for a plurality of players, comprising:
   a generally flat casing;
   a flat display screen provided on an upper surface of the casing, wherein the flat display screen is for use with a plurality of electronic games, each electronic game having a different appearance when displayed on the flat display screen;
   a central processing unit having electronic processing, storage, and interface circuits housed in the casing, and a display control circuit for controlling a display on the flat display screen, wherein the display control circuit is configured to alter an orientation of a display of a game on the flat display screen so as to change the orientation to make it suitable to a particular player of the plurality of players, and each player of the plurality of players sees the display of the game in the orientation which is most appropriate to the player when it is the player's turn to play;
   a portable object having a system identifier, forming a right to access an execution of the game in the central processing unit; and
   a plurality of identical user interface elements, each for a corresponding one of the plurality of players, separate from the casing, connected via a wireless link to the interface circuits housed in the casing, and adapted to be distributed around the flat display screen of the flat casing,
   wherein each of the plurality of user interface elements comprises a player display, a set of buttons, including up, down, left, and right movement buttons, and a thumbwheel to move a text cursor over the player display, and circuits for user communication with the interface circuits of the central processing unit, for acting on a position of a display element displayed by the flat display screen of the casing, wherein each of the plurality of user interface elements are provided with a code forming an indication of a side of the casing from which the user interface element is used, and the central processing unit is configured to change the way in which the up, down, left, and right movement buttons act on a directional movement of the display element displayed by the flat display screen of the casing, depending upon the indication of the side of the casing from which the user interface element is used.

2. The electronic multiuser screen platform of claim 1, wherein the casing has a generally rectangular shape, and the display control circuit alters the orientation of the display of the game on the flat display screen by 90° each time.

3. The electronic multiuser screen platform of claim 1 further comprising a set of loudspeakers for sound reproduction.

4. The screen platform as claimed in claim 1, wherein the casing has a generally rectangular shape, with sets of user interface elements on its four sides.

5. The screen platform as claimed in claim 1, wherein a code is provided for each set of user interface elements depending from which side of the casing each set of user interface elements is to be used and/or from the position of each set of user interface elements.

6. The electronic multiuser screen platform as claimed in claim 1, wherein the casing includes arrangements for maintaining the screen platform in a vertical position, wherein the platform has a first, horizontal use position and a second, vertical use position.

7. The screen platform as claimed in claim 1, wherein the display control circuit is configured to turn the orientation of the display on the flat screen by 90° each time.

8. The screen platform as claimed in claim 1, further comprising a plurality of recesses for the plurality of sets of user interface elements, provided at the periphery of the casing and adapted to receive the respective sets of user interface elements in a position such that said user interface elements are accessible for playing, whereby each set of user interface elements can adopt a first use position inside its respective recess and a second use position outside of its recess.

9. The screen platform as claimed in claim 8, wherein the sets of user interface elements are connected to the electronic interface circuits via cables and separable connectors on each side of the casing.

10. The screen platform as claimed in claim 1, further comprising a touch-sensitive detection device superimposed on the screen.

* * * * *